Patented June 29, 1943

2,323,029

UNITED STATES PATENT OFFICE 2,323,029

ACIDPROOF CEMENT

Hobert R. Goodrich, Glendale, Calif., assignor to Gladding, McBean & Company, San Francisco, Calif., a corporation of California No Drawing. Application January 31, 1939, Serial No. 253,783

21 Claims. (Cl. 106—84)

This invention relates to an improved composition for use as a cement or mortar under acid conditions of service.

Various types of cements have been compounded to meet this service, most of which consists of a fairly viscous alkaline silicate at 38° Bé. or more, with a pulverized quartz, bisque or flint powder and often with small amounts of acid-forming materials to hasten the hardening of the cement.

Several methods are employed to introduce the acid-forming portion although the addition of alkali and alkaline-earth silico-fluorides is the most popular. As early as 1878 the use was suggested of such fluorine compounds in British patent to Meyer, No. 1,390, and United States patent to Meyer, No. 209,770, of November 12, 1878.

I have discovered a very important improvement in cements of this character by a partial or entire substitution for the powdered quartz content heretofore used of a powdered soda lime glass which imparts to the cement greater plasticity, greater density, and increased resistance to water slaking, all of which is accounted for by the tendency of the alkali to dissolve the glass and form a more compact cement than is the case where the inert silica is used.

A further improvement is made by the incorporation of a small amount of asbestos fibre into the cement mixture, and I have found that the asbestos fibre acts to reduce the slipperiness of the cement or mortar in use so that when applied to the vitrified tile or brick, the latter do not slide out of place when set in the wall, as occurs with the usual alkali silicate and silica compositions.

Furthermore, my composition contains rather large amounts of acid reacting fluorides and these are introduced as a finely ground powder in order that they may be thoroughly dispersed throughout the cement. Thus they set or harden the liquid silicate to a uniform fine-grained texture without the formation of small granules and pellets such as are produced by coarsely ground silico-fluorides. Also, I use an alkali silicate having a high silica content, so that a minimum of free sodium oxide is present, as I have found that the excess presence of the latter has a deleterious effect on the final cement in respect to its resistance to both weak alkalies and water. Also, I have found that the high silica sodium silicates produce a faster setting and more dense cement than is made from the silicates of lower silica content; for example, the use of silicates of the same densities but having soda to silica ratios of 1 to 3.2, 1 to 3.3, and 1 to 3.5, produced with the same powder mixture; cements having the following respective absorptions: 18.3%, 16.1% and 14.8% in a 10% hydrochloric acid solution. Likewise, the initial setting times were reduced in the same respective manner, the actual times being 51, 43, and 33 minutes. Conversely, it has been found that a silicate having a low silica content with a ratio of $Na_2O$ to $SiO_2$ of 1 to 2.44 will be very slow to set even in the presence of silico-fluorides and will be similar in behavior to cements made with sodium silicates of a higher silica content but without any acid-forming compounds. For these reasons I prefer to use silicates having $Na_2O$ to $SiO_2$ ratios of from 1 to 3.2 up to 1 to 3.86 and generally prefer those near the latter value. I further prefer to use these silicates at a density of 33.5° Bé. The 1 to 3.86 type of silicate, unlike the types higher in soda content which are obtainable in several densities ranging from 38° Bé. to 69° Bé., is made only at 33.5° Bé. as a result of its higher silica content and therefore lower solubility.

The grade of asbestos employed is chosen as to its size and length of fibre and known in the trade as grade 0–0–10–6 as established by the Bureau of Mines Bulletin No. 403 (1937), entitled "Asbestos." Asbestos is graded by taking one pound (16 ounces) of the fibre and vibrating it over a series of screens of 2 mesh, 4 mesh, and 10 mesh. The weights of the material caught on each of these meshes and the material passing through the 10 mesh are then determined in ounces and this becomes the description of the asbestos grade. For example, in the grade just mentioned it would mean that no fibres were caught on the 2 mesh, no fibres were caught on the 4 mesh, 10 ounces on the 10 mesh and 6 ounces passed through, or were finer than the 10 mesh.

Following is one example of my acid proof composition in parts by weight:

| | |
|---|---|
| Powdered silica (200 mesh) | 40 |
| Asbestos fibre (0–0–10–6) | 2 |
| Ground glass (200 mesh) | 52 |
| Sodium silicofluoride (200 mesh) | 6 |
| Total | 100 |
| Sodium silicate (33.5° Bé. and having $Na_2O:SiO_2$ ratio of 1:3.5) | 45 |

The amphibole types of asbestos are to be preferred over the chrysotile types due to the greater acid resistance of the former. For the glass, I prefer to use the product obtained from grinding bottles and cullet from glass manufacturers using a soda-lime silica composition who have developed a high degree of acid resistance in their product as shown by the standard powder test.

For some tyes of service such as for the grouting of wide joints, it may be preferable to use a coarser aggregate to insure against cracking of the joint and for this purpose I prefer to use a coarser silica or a silica sand of the type represented by the commercial product known as "Ottawa silica." The following composition is an example in parts by weight:

| | |
|---|---|
| Silica sand (—50 mesh) | 30 |
| Asbestos sands | 4 |
| Ground glass (—200 mesh) | 56 |
| Sodium silico-fluoride (—200 M) | 10 |
| Total | 100 |
| Sodium silicate (33.5° Bé. and of Na$_2$O:SiO$_2$ as 1:3.8) | 42 |

Commercial silico-fluorides have been found to lack the fineness desirable for the production of a smooth evenly jelled cement, as shown by the following screen analyses of two commercial products:

| | Grade A | Grade B |
|---|---|---|
| | *Percent* | *Percent* |
| Caught on No. 100 mesh | 12.0 | 64.7 |
| Through No. 100 and plus No. 200 mesh | 72.9 | 33.9 |
| Through No. 200 mesh | 15.1 | 1.4 |

For this reason I prefer to take the commercial products and regrind them usually with a portion of the glass to a size such that all of the material will pass at No. 200 mesh. This is then mixed with the other dry ingredients prior to the addition of the liquid silicate. Other acid-forming materials may be substituted for the sodium silico-fluoride with considerable success, amongst which are sodium and potassium acid fluorides and barium and magnesium silico-fluorides. The quantities to be used will be dependent upon their respective activities as, for example, it will only be necessary to use approximately two parts of sodium acid fluoride to obtain the same hardening time as given with six parts of sodium silico-fluoride. Combinations of the several acid-forming fluorides have also produced very satisfactory cements with glass, as illustrated by the following composition in parts by weight:

| | |
|---|---|
| Ground glass (—200 mesh) | 71 |
| Ottawa silica (—80 mesh) | 20 |
| Asbestos (0-4-8-4) | 1 |
| Potassium bifluoride | 2 |
| Sodium bifluoride | 2 |
| Magnesium silico-fluoride | 2 |
| Sodium silico-fluoride | 2 |
| Total | 100 |
| Sodium silicate (33.5° Bé. and of Na$_2$O:SiO$_2$ as 1:3.2) | 45 |

Furthermore, it is possible to compound all of the above cements by using so-called powdered sodium silicates in place of the liquid silicates. For such cases it is necessary to add between 20 and 30 parts of the dry silicate which contain about 17.5 per cent of water and sufficient water to develop the required workability.

The foregoing practical and tested examples are but typical of various combinations and modifications possible within the scope of the invention.

It may be stated, in general, that the ground glass of the composition may vary from 30 to 80 parts, that the asbestos fibre or sands may vary from 1 to 10 parts, that if sodium silico-fluoride is used the amount thereof may vary from 6 to 10 parts, or a corresponding amount of other acid-forming fluorides and/or silico-fluorides having a positive radical selected from the group of alkali and alkali earth metals. The composition also contains a solution of sodium silicate in an amount sufficient to make the resultant composition of a plastic nature. Preferably, as hereinbefore set forth, the sodium silicate has a silica to soda ratio greater than 3.2 to 1, or between 3.2 to 1 and 3.86 to 1, and a density of approximately 33.5° Bé. To the above ingredients there may also be added a filler of powdered or coarse silica. It may also be noted that various mixtures of acid fluorides and silico-fluorides may be used or a single compound.

The use of the term "cement" as used in some of the claims is intended to include a mortar.

I claim:

1. An acidproof cement, comprising finely divided glass, a minor proportion of asbestos fibre, an acid-forming compound having a positive radical selected from the group consisting of alkali and alkali earth metals and a negative radical selected from the group consisting of fluorides and silico-fluorides, and a sodium silicate having a ratio of silica to soda greater than 3.2 to 1.

2. An acidproof cement, comprising finely divided glass, a minor proportion of asbestos fibre, an acid-forming compound having a positive radical selected from the group consisting of alkali and alkali earth metals and a negative radical selected from the group consisting of fluorides and silico-fluorides, and a solution of sodium silicate having a ratio of silica to soda between 3.2 to 1 and 3.86 to 1, said solution having a density of approximately 33.5° Bé.

3. An acidproof cement, comprising a mixture of from 30 to 80 parts of finely divided glass, 1 to 10 parts of asbestos fibre, 6 to 10 parts of sodium silico-fluoride, and a sufficient quantity of a sodium silicate solution to form a plastic mass, the sodium silicate of said solution having a silica to soda ratio of between 3.2 to 1 and 3.86 to 1 and a density of approximately 33.5° Bé.

4. An acidproof cement, comprising a mixture of from 30 to 80 parts of finely divided glass, 1 to 10 parts of asbestos fibre, 6 to 10 parts of sodium silico-fluoride, 20 to 30 parts of powdered silicate of soda having a silica to soda ratio greater than 3.2 to 1 and sufficient water for workability.

5. In the process of preparing sodium silicate cements resistant to water and acids from cement powders which contain pulverulent sodium silicate, acid resisting filling agents and substances capable of reacting with the sodium component of the sodium silicate alkalies and are mixed with water, the step which comprises the use of such pulverulent sodium silicate in which the ratio of SiO$_2$ to sodium oxide exceeds 2:1 and the use of a large excess of the substances capable of reacting with sodium oxide over the quantity necessary for neutralizing the sodium component of the sodium silicate used.

6. In the process of preparing sodium silicate cements resistant to water and acids from cement powders which contain pulverulent sodium silicate, acid resisting filling agents and substances capable of reacting with the sodium component of the sodium silicate and are mixed with water, the step which comprises the use of such pulverulent sodium silicate in which the ratio of SiO$_2$ to sodium oxide varies between 3.2:1 and 3.86:1 and the use of a large excess of the substances capable of reacting with sodium oxide over the quantity necessary for neutralizing the sodium component in the sodium silicate used.

7. In the process of preparing sodium silicate cements resistant to water and acids from cement powders which contain pulverulent sodium silicate, acid resisting filling agents and substances capable of reacting with the sodium component of the sodium silicate and are mixed with water, the step which comprises the use of such pulverulent sodium silicate in which the ratio of SiO$_2$ sodium oxide exceeds 3.2:1 and the use of an excess of at least 25 per cent of the substances capable of reacting with the sodium component of the sodium silicate over the quantity necessary for neutralizing the sodium component of the sodium silicate used.

8. In the process of preparing sodium silicate cements resistant to water and acids from cement powders which contain pulverulent sodium silicate, acid resisting filling agents and substances capable of reacting with the sodium component of the sodium silicate and are mixed with water, the step which comprises the use of such pulverulent sodium silicate in which the ratio of SiO$_2$ to sodium oxide varies between 3.2:1 to 3.86:1 and the use of an excess of at least 25 per cent of the substances capable of reacting with sodium silicate over the quantity necessary for neutralizing the sodium component of the sodium silicate used.

9. The process of preparing sodium silicate cements resistant to water and acids comprising mixing powdered sodium silicate in which the ratio of SiO$_2$ to sodium oxide varies between 3.2:1 to 3.86:1 with an excess of a substance capable of reacting with the sodium oxide present in the sodium silicate, an acid resisting filling agent, and water.

10. The process of preparing sodium silicate cements resistant to water and acids comprising mixing sodium silicate in which the ratio of SiO$_2$ to sodium oxide varies between 3.2:1 to 3.86:1 with a material capable of reacting with the sodium oxide of the sodium silicate, said material being present in an excess of at least 25% over that necessary for neutralizing the sodium oxide in the sodium silicate, an acid resisting filling agent, and water.

11. The process of preparing sodium silicate cements resistant to water and acids comprising mixing sodium silicate in which the ratio of SiO$_2$ to sodium oxide varies between 3.2:1 to 3.86:1 with a large amount of a material capable of reacting with the sodium oxide present in the sodium silicate, an acid resisting filling agent including a minor proportion of asbestos fiber, and water.

12. The process of preparing sodium silicate cements resistant to water and acids comprising mixing sodium silicate in which the ratio of SiO$_2$ to sodium oxide exceeds 3.2:1 with a large amount of a material capable of reacting with and neutralizing the sodium oxide present in the sodium silicate, an acid resisting filling agent including ground glass and a minor proportion of asbestos fiber, and water.

13. An acid-proof cement comprising the reaction mixture of water, sodium silicate in which the ratio of SiO$_2$ to sodium oxide exceeds 3.2:1, and a powder containing an acid resistant filling agent, and a material capable of reacting with the sodium oxide present in the sodium silicate, said material being present in an amount greater than that necessary for neutralization of the sodium oxide.

14. A method of preparing water-glass cements resistant to water and acids, comprising mixing sodium silicate in which the ratio of SiO$_2$ to sodium oxide exceeds 3.2:1, with an excess of material capable of reacting with the sodium present in the sodium silicate, an acid resistant filling agent and water.

15. A method of preparing water-glass cements resistant to water and acids, comprising mixing sodium silicate in which the ratio of SiO$_2$ to sodium oxide varies between 3.2:1 to 3.86:1 and a large amount of a substance capable of reacting with the sodium present in the sodium silicate said substance being present in an amount greater than that necessary for neutralization of the sodium of the sodium silicate, an acid resisting filling agent, and water.

16. The process of preparing water-glass cements resistant to water and acids, comprising mixing powdered sodium silicate in which the ratio of SiO$_2$ to Na$_2$O exceeds 3.2:1, with an excess of a substance capable of reacting with the sodium present in the water-glass, an acid resisting filling agent, and water.

17. A cement comprising the reaction mixture of water-glass in which the ratio of SiO$_2$ to Na$_2$O exceeds 3.2:1, a material capable of reacting with the alkali present in the water-glass, said material being present in an amount at least sufficient to prevent the presence of an excess of sodium, an acid resisting filling agent, and water.

18. A cement comprising the reaction mixture of water-glass in which the ratio of SiO$_2$ to Na$_2$O exceeds 3.2:1, a large excess of a material capable of reacting with the sodium present in the water-glass, an acid resistant filling agent, and water.

19. An acid-proof cement comprising the reaction mixture of water, water-glass in which the ratio of SiO$_2$ to Na$_2$O exceeds 3.2:1, and a powder containing an acid resistant filling agent, and a material capable of reacting with the alkali present in the water-glass, said material being present in an amount greater than that necessary for neutralization of the alkali.

20. A cement comprising the reaction mixture of water-glass in which the ratio of SiO$_2$ to Na$_2$O varies between 3.2:1 to 3.86:1, an excess of a material capable of reacting with the sodium present in the water-glass, an acid resisting filling agent, and water.

21. An acid-proof cement comprising the reaction mixture of water, water-glass in which the ratio of SiO$_2$ to Na$_2$O exceeds 3.2:1, an acid resistant filling agent, and a material capable of reacting with the sodium oxide present in the water-glass, said material being present in an excess of at least 25% over that necessary for neutralizing the sodium oxide.

HOBERT R. GOODRICH.